United States Patent [19]

Trepaud

[11] Patent Number: 5,443,021
[45] Date of Patent: Aug. 22, 1995

[54] DUMP AND PROCESS FOR VITRIFYING WASTE

[75] Inventor: Pierre Trepaud, Paris, France

[73] Assignee: Trepaud Environnement, Paris, France

[21] Appl. No.: 147,791

[22] Filed: Nov. 4, 1993

[30] Foreign Application Priority Data

Nov. 12, 1992 [FR] France ............................. 92 13594

[51] Int. Cl.⁶ ............................................. F23G 5/02
[52] U.S. Cl. ................... 110/219; 110/229; 110/235; 110/346; 126/343.5 A
[58] Field of Search ............... 110/346, 229, 233, 219, 110/220, 235; 126/343.5 A, 343.5 R; 431/5

[56] References Cited

U.S. PATENT DOCUMENTS

| | | | |
|---|---|---|---|
| 4,797,091 | 1/1989 | Neumann | 110/220 |
| 4,838,184 | 6/1989 | Young et al. | 431/5 |
| 4,878,440 | 11/1989 | Tratz et al. | 110/229 |
| 4,900,244 | 2/1990 | Keller et al. | 431/5 |
| 5,088,917 | 2/1992 | Leleu et al. | 431/266 |
| 5,301,620 | 4/1994 | Nagel et al. | 110/235 |

OTHER PUBLICATIONS

Resources, Conservation and Recycling vol. 4, Août 1990, Amsterdam pp. 121-133, XP00016 493 H. Willumsen "Landfill Gas" pp. 127-132.

*Primary Examiner*—Carroll B. Dority
*Attorney, Agent, or Firm*—Pearne, Gordon, McCoy & Granger

[57] ABSTRACT

The dump comprises a dumping area (1) provided with a biogas collector (2) which communicates with an electroburner (9).

8 Claims, 1 Drawing Sheet

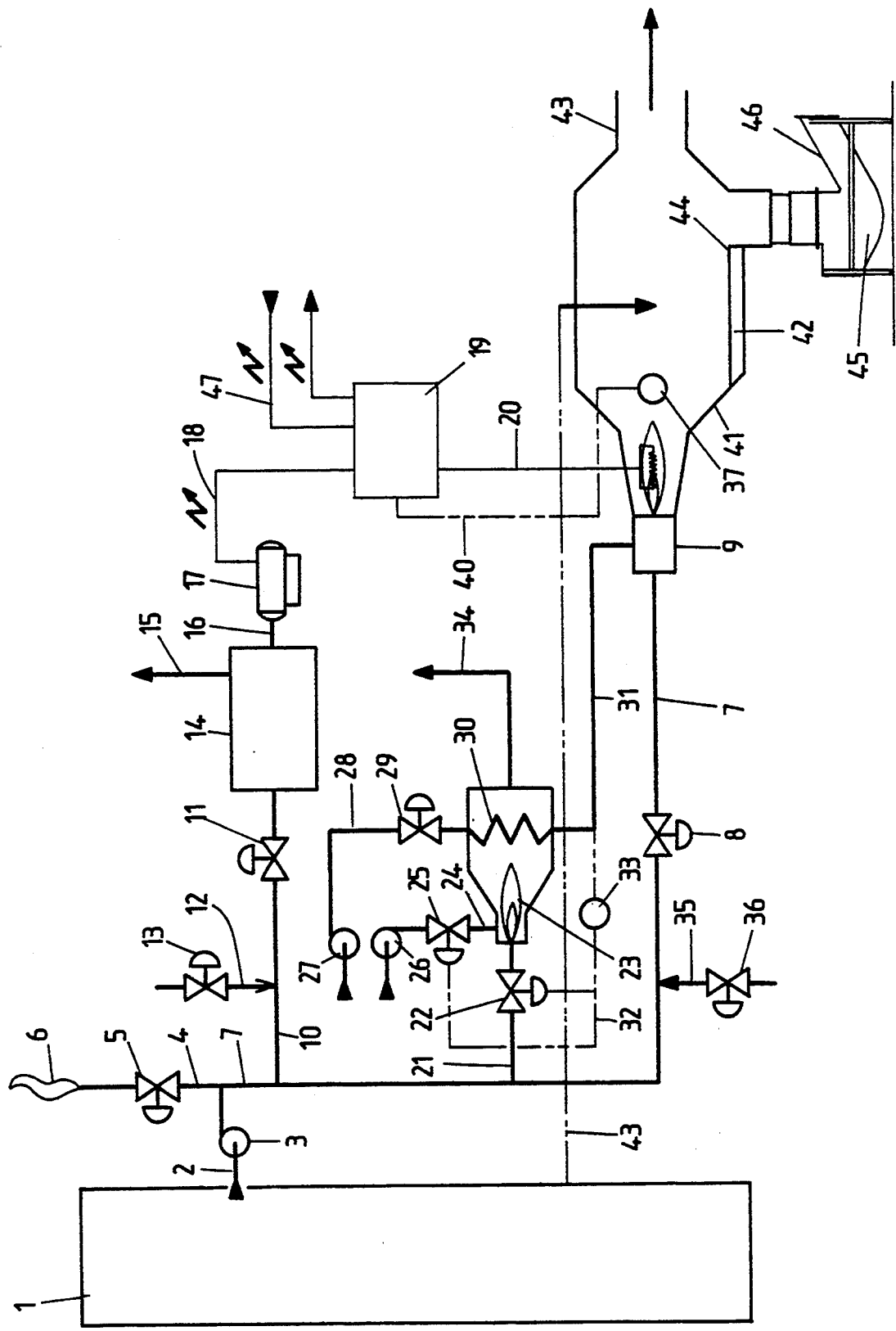

DUMP AND PROCESS FOR VITRIFYING WASTE

This invention relates to dumps for waste, especially household waste and industrial waste, and to processes for vitrifying waste.

A dump produces biogas for at least thirty years or so, this production changing over time, increasing in the early years and decreasing in the latter years. The biogas originating from the decomposition of waste stored in a dump is a poor gas, the volume composition of which is as follows:

|          |           |
|----------|-----------|
| methane  | 40 to 50% |
| $CO_2$   | 25 to 35% |
| nitrogen | 25 to 50% |

A gas of this kind gives a useful flame temperature of approximately 1100° to 1200° C., not sufficient to melt waste.

The invention relates to a dump in which it is possible to utilize the biogas given off by the dump itself for melting the waste and thereby reducing its volume.

The dump comprises a dumping area provided with a biogas collector. According to the invention, the collector communicates with an electroburner.

An electroburner is a gas burner with an electric power supply, as described, e.g. in U.S. Pat. No. 5,088,917, included in this specification by way of a reference. It allows a sufficient temperature to be reached to melt waste under good conditions, whereas, hitherto, it was not profitable to utilize the thermal energy of the biogas originating from a dump generally remote from residential areas, even to supply simple heating installations.

If the electroburner is arranged so as to supply heat to a waste melting furnace of which it forms part, the waste can be melted in a melting furnace using the biogas originating from the waste itself as a fuel in this melting furnace. In this manner, the waste can be converted into vitrified products occupying much less space. A device for supplying the furnace with waste from the dumping area is preferably provided. Biogas and waste are thus eliminated simultaneously from the dump.

In order also to make the dump as autonomous as possible, the collector can communicate with a thermal engine driving an alternator supplying the electroburner with electric power. In this manner, biogas originating from the waste is used to generate the electricity intended to be supplied to the electroburner.

The electroburner can be supplied with air and a device for heating the air supplied to the electroburner can be provided. This device for heating the air supplied to the electroburner preferably communicates with the biogas collector. In this manner, biogas originating from the waste is used to heat the air serving as an oxidant in the electroburner, so that it is possible to increase the temperature that can be reached by the electroburner. This heating temperature can be maintained at values between 400° and 600° C. by a control system. The electroburner supplied in this manner gives a flame the average temperature of which is approximately 1400° to 1500° C. without an electric power supply. By virtue of this flame, a furnace can be kept at a temperature sufficient to keep a magma in the molten state between 1400° and 1500° C.

The waste melting furnace can form part of a vitrifying plant which comprises a waste melting furnace, the waste bath overflowing via an overflow into a tank filled with water, where it is divided into small vitrified pieces as a result of the severe thermal shock. An extractor permanently removes these vitrified elements.

The single FIGURE of the accompanying drawing is a diagram of a dump according to the invention.

The dump according to the invention comprises a dumping area 1 provided with a biogas collector 2. The biogas collector 2 communicates by way of a pump 3 with a conduit 4 provided with a valve 5 and leading to a flare 6 and with a conduit 7 having a valve 8 leading to an electroburner 9.

A conduit 10 provided with a valve 11, upstream of which a conduit 12 having a valve 13 for supplying natural gas flows, branches off from the conduit 7. The conduit 10 supplies a thermal engine 14 provided with a conduit 15 for the discharge of gases towards a chimney and a conduit 16 leading to an alternator 17. An electric conductor 18 supplies electric current to the electroburner 9 by way of a rectifier 19 and a conductor 20.

Another conduit 21 which supplies a burner 23 by way of a valve 22 branches off from the conduit 7. This burner 23 is also supplied with air from an air source 26 via a conduit 24 provided with a valve 25. Another air source 27 supplies a beam 30 for heating the air by the heat emitted by the burner 23, via a conduit 28 and a valve 29. The air leaves the heating beam 30 via a conduit 31 and flows into the electroburner 9. A control circuit 32 comprises a temperature probe 33 for opening the valve 25 to a greater or a lesser extent as a function of the temperature. The burnt gases of the burner 23 are discharged towards the chimney via a conduit 34. The conduit 7 can receive a supply of natural gas via a conduit 35 having a valve 36.

The electric power supply sent to the electroburner 9 can be controlled by a temperature probe 37 in the electroburner 9, via a control circuit 40 leading to the rectifier 19.

The electroburner heats a melting furnace 41 by means of radiation, a bath 42 of melted waste being situated at the bottom of this melting furnace. The waste melting furnace 41 is supplied with waste from the dump 1 by a device 43 indicated by a broken line in the drawing. The gases from the furnace 41 are discharged via a conduit 43. The bath 42 is kept at approximately 1500° C. by the electroburner 9 and overflows via an overflow 44 into a tank 45 filled with water, where the melt is divided into small vitrified pieces as a result of the severe thermal shock. An extractor 46 permanently removes the vitrified elements.

The rectifier 19 is connected to the mains by a conductor 47 so as to take the place of the alternator 17 if the electric power supplied thereby is insufficient. The conduits 12 and 35 for supplying natural gas also serve to compensate for any deficiency in the heat content of the biogas advancing into the conduit 7.

I claim:

1. A dump comprising a dumping area containing waste producing biogas in combination with a collector arranged to collect biogas produced by the waste, an electroburner arranged to supply heat to a waste melting furnace at the dump site, the collector communicating with the electroburner to fuel the latter with biogas produced by the waste, the waste melting furnace including a combustion chamber arranged to receive waste without prior thermal destructive processing and heat from the electroburner for melting and compacting the waste from the dumping area.

2. The dump of claim 1, wherein the collector also communicates with a thermal engine driving an alternator supplying the electroburner with electric power.

3. The dump of claim 2, wherein the electroburner is supplied with air and is provided with a device for heating the air supplied to the electroburner.

4. The dump of claim 3, wherein the device for heating the air supplied to the electroburner also communicates with the biogas collector.

5. The dump of claim 1, wherein the waste melting furnace is followed by a vitrifying tank.

6. An apparatus for thermal treatment of waste from a dump using biogas produced by the waste in the dump to fuel an electroburner for heating and compacting waste, said apparatus comprising a collector for biogas generated by the dump, communication means operably connected between said collector and electroburner to fuel the latter with biogas from said dump, and a waste melting furnace having a combustion chamber adapted to receive heat from said electroburner and waste from said dump without prior thermal destructive processing for heating with melting to compact the waste.

7. An apparatus as in claim 6, further including a thermal engine driving an alternator supplying said electroburner with electric power.

8. An apparatus as in claim 7, wherein said electroburner is arranged to receive preheated air for combustion with said biogas and said apparatus further includes a device for forming the preheated air by heating ambient air with combustion of biogas from the dump.

* * * * *